UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PROCESS OF PRODUCING AMMONIA.

993,144. Specification of Letters Patent. Patented May 23, 1911.

No Drawing. Application filed November 23, 1909. Serial No. 529,642.

*To all whom it may concern:*

Be it known that we, CARL BOSCH, Ph. D., and ALWIN MITTASCH, Ph. D., chemists, subjects, respectively, of the King of Prussia and the King of Saxony, residing at Ludwigshafen-on-the-Rhine, Germany, have invented new and useful Improvements in Producing Ammonia, of which the following is a specification.

Our invention relates to the production of ammonia.

We have discovered that compounds of silicon with nitrogen on being heated with a substance possessing an alkaline reaction (under which term we include oxids and hydroxids for instance of the alkalis and alkaline earth metals as well as salts which have a basic action, such for instance as sodium carbonate) in the presence of water can be made to give rise to ammonia. The water can be present during the reaction either in the liquid state or in the form of steam. The conditions of carrying out the reaction according to this invention vary somewhat, since all silicon nitrogen compounds do not yield nitrogen with the same ease. We generally prefer to carry out the reaction under pressure, although in some cases the employment thereof is not necessary, yet as a rule, the reaction proceeds better when pressure is used. During the reaction the substance possessing an alkaline reaction may be present, for instance either in the form of a solution or suspension.

The process of our invention can be applied to compounds of silicon containing nitrogen, whether such compounds have been obtained according to the methods already described in the literature, or according to the process described in the specification of British Patent No. 15,641/09. It can also be used to obtain ammonia from mixtures of silicon-nitrogen compounds with other nitrids, such mixtures are described in the aforesaid specification of British Patent No. 15,641/09.

As a general rule, the higher the content of nitrogen in the compound being treated, the more energetic is the action required to yield ammonia, for instance, the strength of the alkali used should be greater and a higher temperature should be employed.

The reaction which takes place according to the process of the present invention may be illustrated for instance by the following equations:

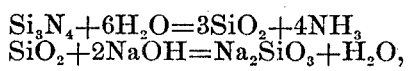
$$Si_3N_4 + 6H_2O = 3SiO_2 + 4NH_3$$
$$SiO_2 + 2NaOH = Na_2SiO_3 + H_2O,$$

but we do not in any way restrict the present application to the process illustrated by these equations.

The following examples will serve to illustrate further the nature of our invention, which, however, is not confined to these examples. The parts are by weight.

Example 1: Grind well together twenty parts of the compound obtained according to any one of the examples of British Patent No. 15,641 of 1909, and twenty parts of quicklime, and then heat the mixture with two hundred parts of water, in an autoclave, for six hours, at a temperature of one hundred and sixty degrees centigrade. After the reaction is over, the ammonia formed can be allowed to escape from the autoclave through a valve.

Example 2: Mix together ten parts of the product obtainable according to any one of the examples of British Patent No. 15,641 of '09, and forty parts of twenty per cent. caustic soda solution, and boil the mixture in a reflux apparatus for twenty hours. The ammonia evolved can be absorbed by means of acid, or it can be treated, or used, in any other suitable manner.

Example 3: Heat thirty parts of silicon nitrid, obtained by heating ferro-silicon in a current of nitrogen, with one hundred and ten parts of thirty-five per cent. caustic soda solution in an autoclave, for six hours, at one hundred and eighty degrees centigrade.

Example 4: Heat fifty parts of the silicon-nitrogen compound obtained from silica, carbon and nitrogen, as described in German Patent No. 88,999, with two hundred and forty parts of milk of lime of twenty-five degrees Beaumé, and five parts of sodium carbonate, for eight hours in an autoclave, while stirring, and at a temperature of about one hundred and fifty degrees centigrade.

Now what we claim is:—

1. The process of producing ammonia by heating a compound of silicon and nitrogen with a substance possessing an alkaline reaction in the presence of water.

2. The process of producing ammonia by heating a compound of silicon and nitrogen with a substance possessing an alkaline reaction in the presence of water and carrying out the heating under pressure.

3. The process of producing ammonia by heating silicon nitrid under pressure with a substance possessing an alkaline reaction in the presence of water.

4. The process of producing ammonia by heating silicon nitrid under pressure with an aqueous solution of caustic soda.

In testimony whereof we have hereunto set our hands in the presence of two subscribing witnesses.

CARL BOSCH.
ALWIN MITTASCH.

Witnesses:
J. ALEC. LLOYD,
W. W. F. CHURCH.